(12) United States Patent
Davis et al.

(10) Patent No.: US 6,457,493 B1
(45) Date of Patent: Oct. 1, 2002

(54) METHOD AND APPARATUS FOR EFFICIENT DISTRIBUTION AND RECOVERY OF RECYCLABLE/ RECLAIMABLE MATERIALS

(76) Inventors: Gary W. Davis, P.O. Box 1288, Montgomery, TX (US) 77356; Jon W. Fisher, 401 Gallaher View Rd., No. 133, Knoxville, TN (US) 37919

(*) Notice: Subject to any disclaimer, the term of this patent is extended or adjusted under 35 U.S.C. 154(b) by 0 days.

(21) Appl. No.: 10/001,874

(22) Filed: Nov. 19, 2001

Related U.S. Application Data

(62) Division of application No. 09/858,468, filed on May 16, 2001, now Pat. No. 6,318,417, which is a division of application No. 09/321,527, filed on Feb. 2, 1999, now Pat. No. 6,234,220, and a continuation-in-part of application No. 08/922,812, filed on Sep. 3, 1997, now abandoned, which is a continuation of application No. 08/582,950, filed on Jan. 4, 1996, now abandoned.

(51) Int. Cl.[7] .................................................. B65B 1/04
(52) U.S. Cl. ........................................................ 141/1
(58) Field of Search ............................ 141/1, 2, 18, 21, 141/98, 231; 220/254, 573; 184/1.5, 106

(56) References Cited

U.S. PATENT DOCUMENTS

| | | | |
|---|---|---|---|
| 3,410,438 A | 11/1968 | Bartz | 220/1 |
| 4,098,398 A * | 7/1978 | Meyers | 141/340 |
| 4,301,841 A | 11/1981 | Sandow | 141/98 |
| 4,403,692 A | 9/1983 | Pollacco | 206/223 |
| 4,513,865 A | 4/1985 | Melzi et al. | 206/508 |
| 4,533,042 A | 8/1985 | Pollacco | 206/223 |
| 4,632,268 A | 12/1986 | Melzi et al. | 220/1 |
| 4,802,599 A | 2/1989 | Hill | 220/1 |
| 4,823,947 A | 4/1989 | Maynard, Jr. | 206/223 |
| 4,881,650 A | 11/1989 | Bartz | 220/1 |
| 5,082,035 A | 1/1992 | Maxwell | 141/98 |
| 5,190,085 A | 3/1993 | Dietzen | 141/98 |
| 5,375,703 A | 12/1994 | Deuber | 206/223 |
| 5,503,246 A | 4/1996 | Raboin et al. | 184/1.5 |
| 5,647,414 A * | 7/1997 | Brittain et al. | 141/1 |
| 6,068,032 A * | 5/2000 | Milner | 141/10 |
| 6,085,806 A | 7/2000 | Davis et al. | 141/98 |
| 6,318,417 B1 | 11/2001 | Davis et al. | 141/1 |

* cited by examiner

*Primary Examiner*—Timothy L. Maust

(57) ABSTRACT

New or unused consumable product is distributed with a package capable of capturing the used or spent product for transmission to a recycling or disposal facility. The package is preaddressed for delivery to an appropriate reclamation center or disposal facility, with prepaid delivery charges for a commercial package service. At the reclamation center or disposal facility, the used or spent product is separated from the package for recycling and reusable portions of the package are again packaged with new or unused product, with any waste materials being properly handled. In the exemplary embodiment of motor oil, the package includes a drain pan jug for capturing the used motor oil and a shell for transmitting the drain pan jug and its contents to a reclamation facility. The shell may be reused until no longer serviceable, at which time it may be recycled. The drain pan jug, after use, may be shredded and utilized as fuel. Waste materials, such as a used oil filter, or medical waste in an alternative embodiment, are properly disposed of by a competent waste handler.

2 Claims, 5 Drawing Sheets

METHOD AND APPARATUS FOR EFFICIENT DISTRIBUTION AND RECOVERY OF RECYCLABLE/ RECLAIMABLE MATERIALS

RELATED APPLICATIONS

This application is a divisional application of Ser. No. 09/858,468 filed May 16, 2001, now U.S. Pat. No. 6,318,417 issued Nov. 20, 2001, which is a divisional application of Ser. No. 09/321,527 filed Feb. 2, 1999, now U.S. Pat. No. 6,234,220 issued May 22, 2001, and a continuation-in-part of commonly assigned, U.S. patent application Ser. No. 08/922,812 filed Sep. 3, 1997 now abandoned, which is a continuation of Ser. No. 08/582,950, entitled "POSTAL OIL BOX" and filed Jan. 4, 1996 now abandoned, which is incorporated herein by reference.

BACKGROUND OF THE INVENTION

1. Technical Field

The present invention relates generally to distribution and recovery of recyclable/reclaimable products and in particular to packaging of recyclable/reclaimable products for efficient distribution and recovery. Still more particularly, the present invention relates to efficiently recovering recyclable/reclaimable products by distribution of new or unspent product in packaging adapted for capture of used or spent product and subsequent conveyance by commercial package service to a recycling/reclamation center.

2. Description of the Related Art

A variety of consumable goods or products are amenable to recycling and/or reclamation through suitable processes. An example is motor oil of the type and grade typically utilized for passenger and light transport vehicles. The American Petroleum Institute reports that 1.4 billion gallons of used motor oil is generated in the United States each year. Of this amount, the Environmental Protection Agency (EPA) estimates that, annually, approximately 143 million gallons—the equivalent of 14 Exxon Valdez spills each year—ends up contaminating the environment. Other studies indicate that the amount of improperly managed used motor oil may be as high as 455 million gallons each year.

One oil change, or about one gallon of used motor oil, can contaminate one million gallons of drinking water. The contaminants found in used motor oil include: hydrocarbons at approximately the level found in virgin oils, polyalpha-hydrocarbons at increased levels due to contamination and chemical reactions during use of the motor oil, and—perhaps most harmful—heavy metals.

Waste oil handlers lacking the desire or expertise to properly manage used motor oil are significant contributors to this problem. However much of the used motor oil contaminating the environment comes from small quantity generators such as individuals performing their own automotive maintenance (often referred to as do-it-yourself oil changers or "DIYers"), pouring the used motor oil around a fence or tree or into the nearest storm drain. Industry studies indicate that 60% of the passenger cars and light duty trucks in the United States are serviced by individual owners. Farmers and small business owners with vehicle fleets of ten or less substantially increase the amount of used motor oil which is improperly managed.

Used motor oil can be recycled almost indefinitely since it never wears out, it only gets dirty. Use of re-refined motor oil in government vehicles is presently being mandated or encouraged at both the state and federal levels. In addition to being re-refined, reclaimed may be used as burner fuels and in other applications.

A principal obstacle to encouraging recycling of used motor oils, particularly with individuals maintaining their own vehicles, is convenience in capturing the used motor oil in a container suitable for transportation and/or transmitting the used motor oil to an appropriate recycling facility. Participation by individuals is hampered by the inconvenience of capturing the used oil, pouring the used oil into a container for transportation, and transporting the used oil to the recycling center. Not knowing what to do with the captured used oil (or other product) or not willing to take the necessary steps, many individuals allow the used oil to drain directly onto the ground or into a storm drain.

Even if the consumable goods cannot be recycled or reclaimed, often the goods require special handling for proper disposal, such as medical waste and the like. In such situations, again, a principle obstacle to obtaining proper disposal of the expended goods is transportation to an appropriate disposal facility.

It would be desirable, therefore, to provide a method and system for efficient distribution and recovery of recyclable/ reclaimable consumable goods or goods requiring special disposal. It would further be advantageous for the method and system to be adaptable to distribution and recovery of goods which, when. expended, consititute hazardous waste.

SUMMARY OF THE INVENTION

New or unused consumable product is distributed with a package capable of capturing the used or spent product for transmission to a recycling or disposal facility. The package is preaddressed for delivery to an appropriate reclamation center or disposal facility, with prepaid delivery charges for a commercial package service. At the reclamation center or disposal facility, the used or spent product is separated from the package for recycling and reusable portions of the package are again packaged with new or unused product, with any waste materials being properly handled. In the exemplary embodiment of motor oil, the package includes a drain pan jug for capturing the used motor oil and a shell for transmitting the drain pan jug and its contents to a reclamation facility. The shell may be reused until no longer serviceable, at which time it may be recycled. The drain pan jug, after use, may be shredded and utilized as fuel. Waste materials, such as a used oil filter, or medical waste in an alternative embodiment, are properly disposed of by a competent waste handler.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
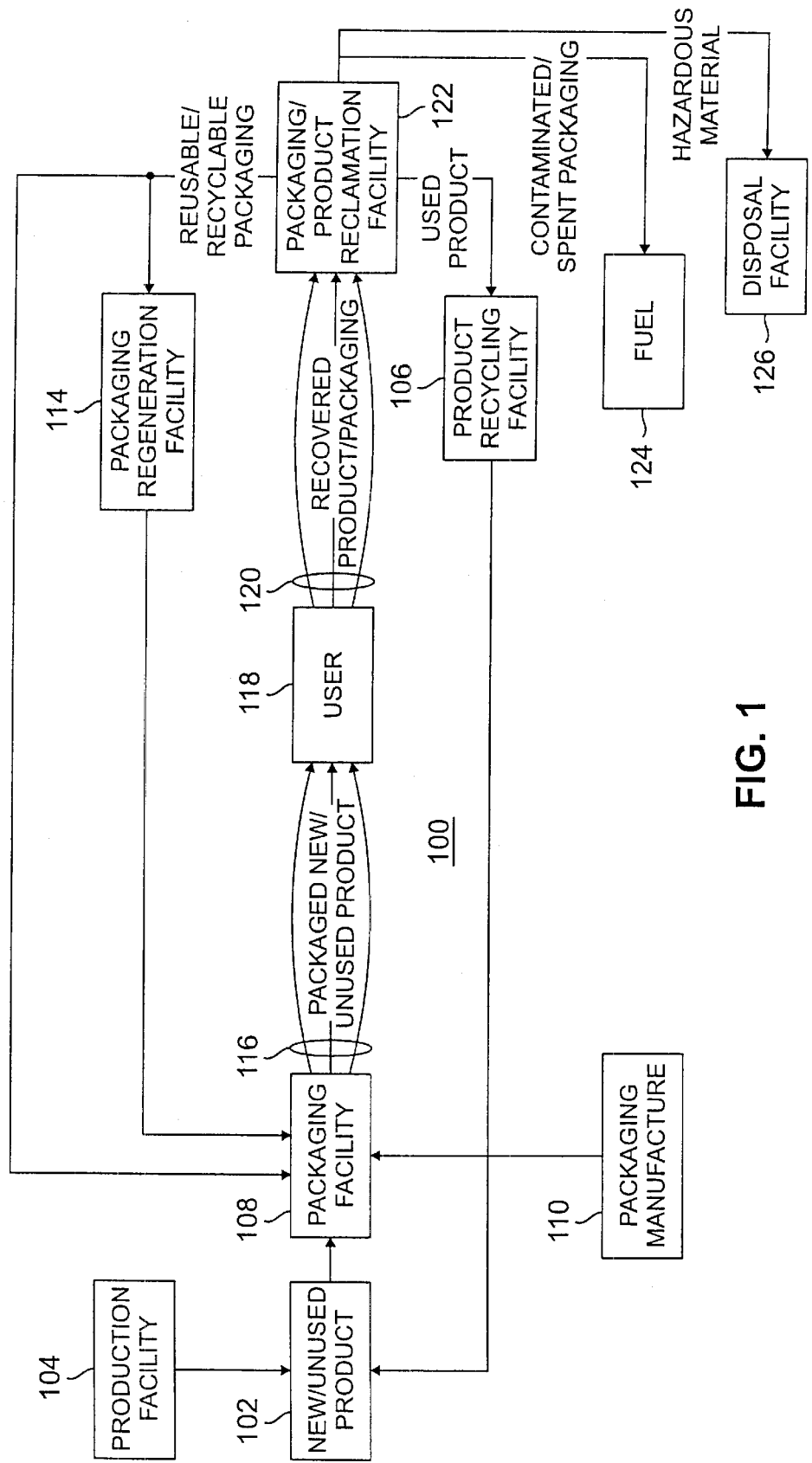
FIG. 1 depicts a diagram of a system for distribution and recovery of recyclable or reclaimable goods in accordance with a preferred embodiment of the present invention.

With reference now to the figures, and in particular with reference to FIG. 1, a diagram of a system for distribution and recovery of recyclable or reclaimable goods in accordance with a preferred embodiment of the present invention is depicted. The exemplary embodiment depicted is for distribution and recovery of motor oil. Distribution and recovery system 100 begins with new or unused (i.e., recycled or reclaimed) product 102 in a condition suitable for consumption or for employment in its intended purpose. New or unused product 102 is received either from a production facility 104, such as a manufacturing plant or refinery, or from recycle facility, 106 in the form of recycled product. Production facility 104 and recycle facility 106 may be either the same or different enterprises. In the exemplary embodiment, production facility 104 may be a refinery. producing motor oil in accordance with the known art, while recycle facility 106 may be a used motor oil recycling and/or reclamation center employing processes for recovery of usable motor oil from spent motor oil known in the industry.

New or unused product 102 is then packaged in a packaging facility 108. Again, packaging facility 108 may be separate from or a part of the same enterprise as production facility 104 and/or recycle facility 106. Packaging facility 108 packages the product in distribution packaging, which is provide in whole or in part from packaging manufacturing facility 110 or at least in part by packaging/product reclamation facility 112 and/or packaging regeneration facility 114.

One feature of the present invention is that the distribution packaging employed to distribute new or unused product 102 is also employed to capture and recover the used or spent product. The entirety or merely a portion of the distribution packaging may therefore be utilized to transmit used or spent product to a recycling or reclamation facility. Suitable distribution and recovery packaging for the exemplary embodiment of motor oil is described in further detail below.

The packaged product is next transmitted through conventional distribution channels 116 (e.g., wholesale, retail, etc.) to the user 118. User 118 utilizes the new or unused product 102 and captures the used or spent product with at least a portion of the distribution packaging. User 118 then transmits the recovered product, together with and contained within the portion of the distribution packaging utilized to recover the spent product, to a reclamation facility 122 through recovery channels 120.

A second aspect of the present invention is that the recovery channels 122 are preferably commercial package services, such as the United States Postal Service, Federal Express, United Parcel Service, and the like. The portion of the distribution package which is designed for recovery of used or spent product may be pre-addressed for delivery to reclamation facility 122. Delivery charges for transmission of the recovered product to reclamation facility 122 may also be prepaid, as with prepaid postage and the like. In this manner, recovery of the used or spent product for recycling or reclamation is greatly facilitated.

Within product/packaging reclamation facility 1221 the used or spent product is separated from the recovery packaging and transmitted to recycling facility 106. Reusable and/or recyclable packaging is returned to packaging facility 108, either directly if the packaging is reusable without significant restoration or through regeneration facility 114 if the packaging requires significant recycling. In the exemplary embodiment, part of the recovery packaging may be directly reused while another part is subject to regeneration as described in further detail below. Additionally, those portions of the contaminated or spent packaging which can not be either recycled or reused may be processed for use as fuel at fuel generation facility 124 or properly handled at disposal facility 126 in accordance with all federal, state and local regulations to insure protection of human health and the environment.

Figure 2:
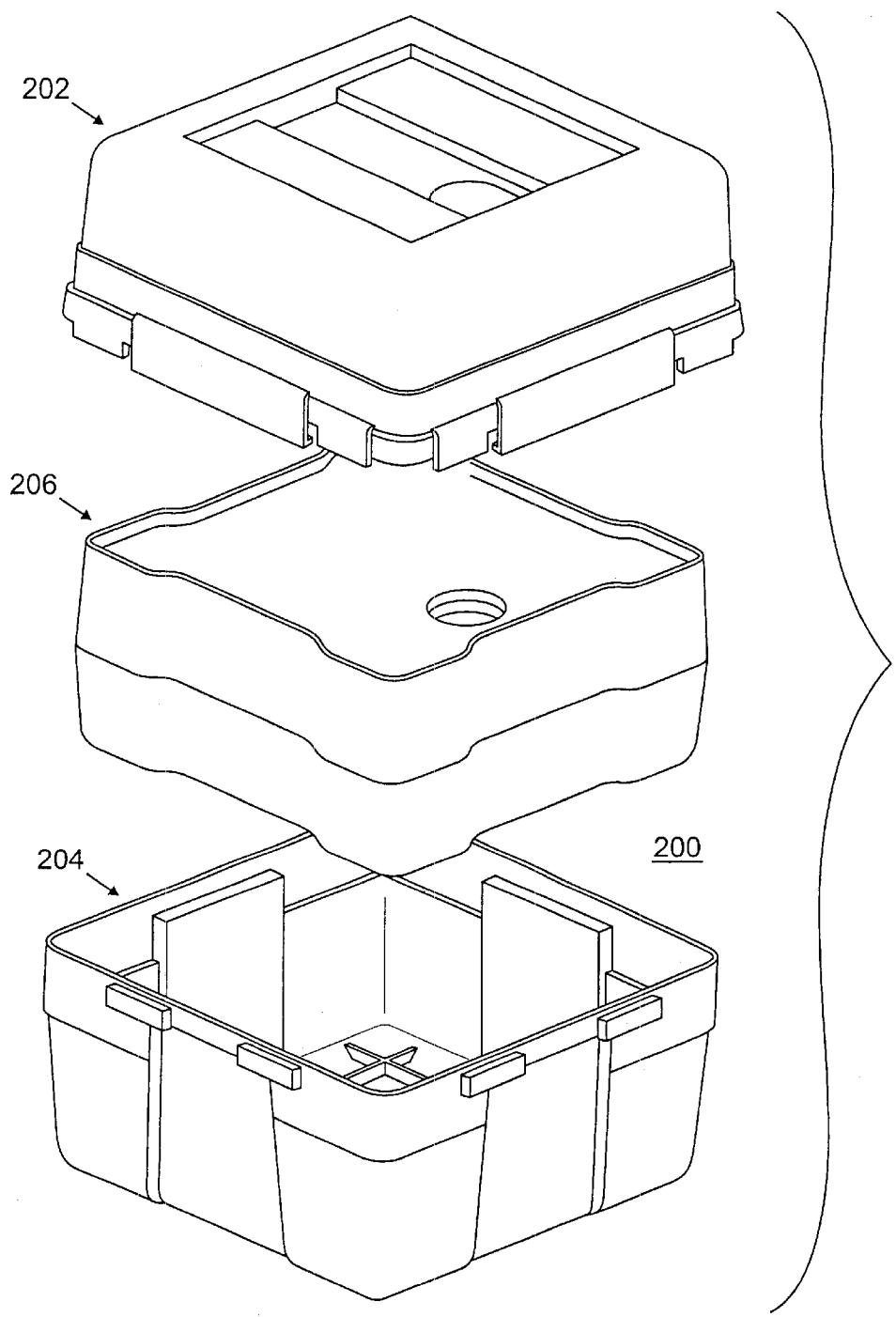
FIG. 2 is an exploded, perspective view of a package suitable for motor oil distribution and recovery in accordance with a preferred embodiment of the present invention.

Referring to FIG. 2, an exploded, perspective view of a package suitable for motor oil distribution and recovery in accordance with a preferred embodiment of the present invention is illustrated. Package 200 may be employed in a distribution and recovery system of the type depicted in FIG. 1. Illustrated in FIG. 2 are the packaging components which may be utilized for both distribution and recovery.

Package 200 includes upper and lower shells 202 and 204, respectively, and a drain pan jug 206. Upper and lower shells 202 and 204 are constructed of high density polyethelene (HDPE) preferably having wall thicknesses of approximately 0.12 inches. The composition and construction of upper and lower shells 202 and 204 are essentially the same as that of an ordinary plastic tackle box or tool case, and may be injection molded.

Drain pan jug 206 is also formed of HDPE, but has a lighter construction essentially the same as that of an ordinary plastic milk jug, and may be thus be blow-molded, but of a type withstanding the properties of the spent material, such as the heat of drained used motor oil. Drain pan jug 206 fits within lower shell 204, serves to capture used motor oil as it is drained from a vehicle, and holds captured used or spent motor oil during transmission to a reclamation facility. The details of the construction of package 200 are described further below.

Figure 3A:
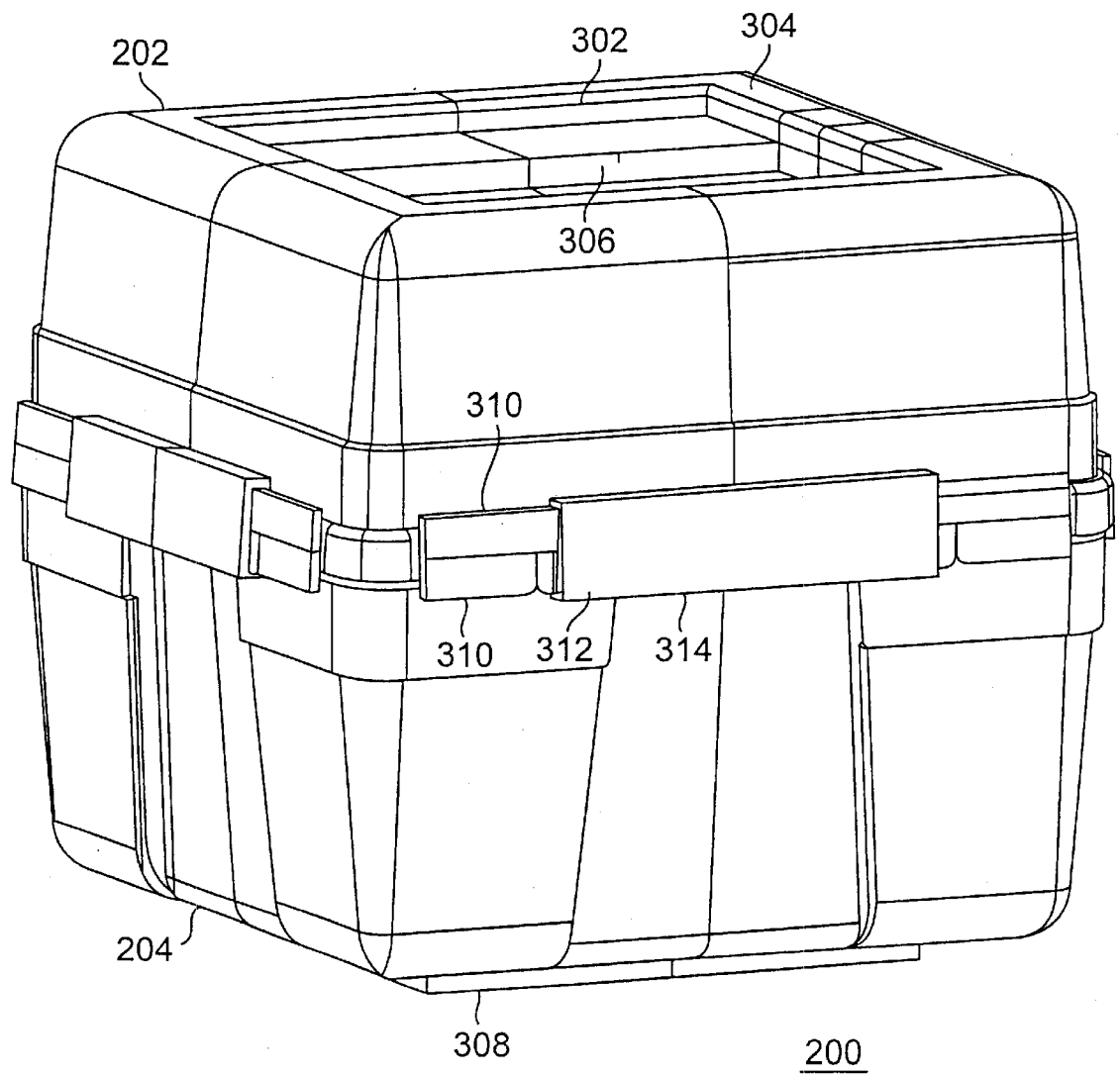
FIGS. 3A–3C depict various views of the package for motor oil distribution and recovery in accordance with a preferred embodiment of the present invention.
Figure 3B:
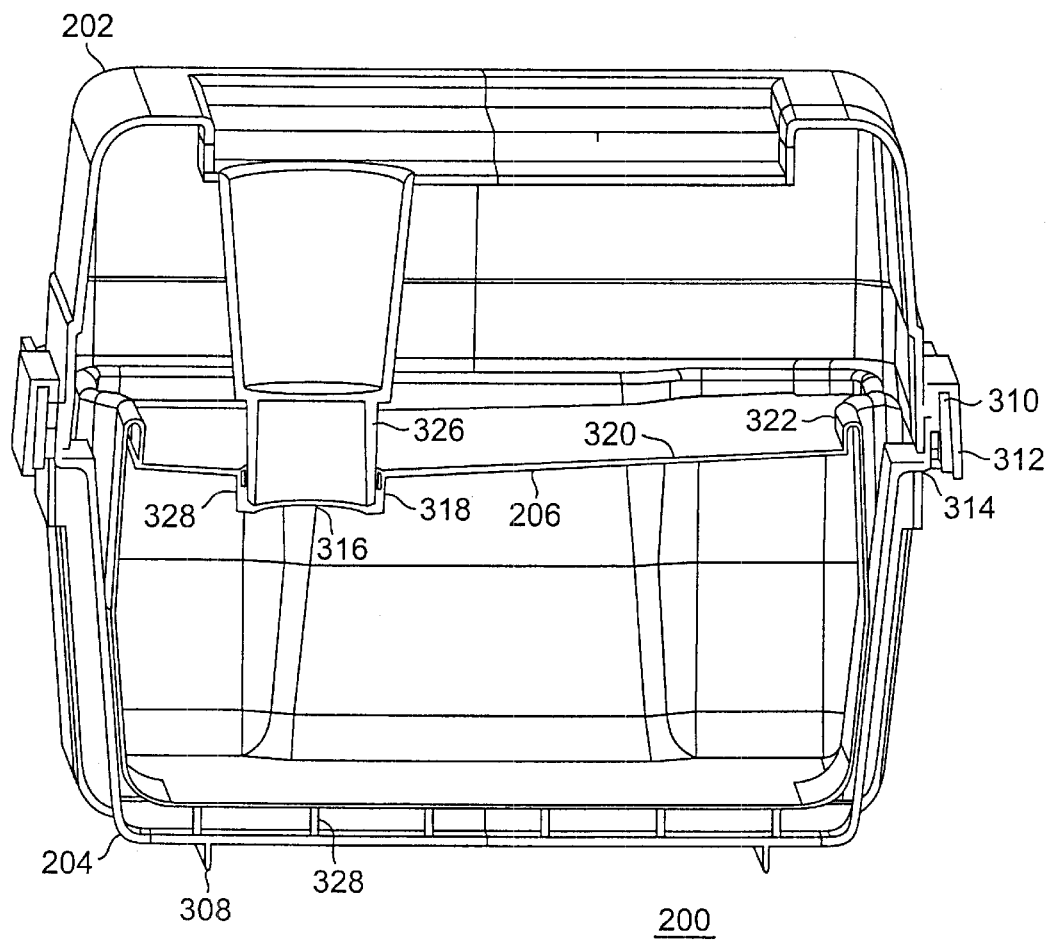
Figure 3C:
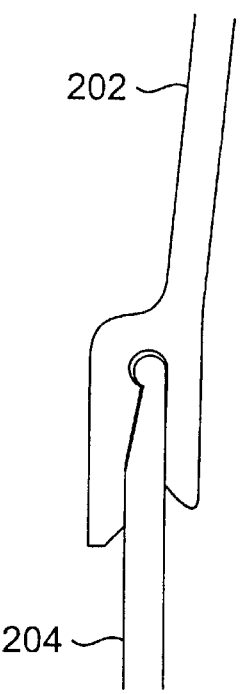

With reference now to FIGS. 3A through 3C, various views of the package for motor oil distribution and recovery in accordance with a preferred embodiment of the present invention are depicted. FIG. 3A depicts package 200 in an assembled state, with upper shell 202 affixed to lower shell 204 to form a liquid-impermeable enclosure therein. Upper and lower shells 202 and 204 both have battered or slanted sides as depicted, to facilitate nested stacking of empty shells as described below. Upper shell 202 includes a stacking ledge 302 in the upper surface 304 defining a recess 306 for receiving stacking rails 308 on the bottom surface of lower shell 204. Thus package 200, when assembled, may be reliably stacked upon a similar assembled package.

Package 200, when assembled, is preferably approximately 10 inches high and 12 inches in length and width, dimensions which are compatible with existing shipping requirements and shelving requirements. See, for example, Publication 52 and *Domestic Mail Services* (DMM Issue 42, Mar. 15, 1992) sections 120–124 by the United States Postal Service, and the applicable sections of the United States Code and Code of Federal Regulations, all of which are incorporated herein by reference.

Upper and lower shells 202 and 204 both include, along each major edge of the rims at which they are joined, a lip 310 oppositely oriented with respect to the rim of the respective upper or lower shell 202 or 204. In the example shown, lip 310 is a protrusion from the rim of the respective upper or lower shell 202 or 204 having a T- or L-shaped cross-section. On at least one of the upper and lower shells 202 and 204, lip 310 extends for only a portion of the edge length, providing a catch for sliding latch 312.

Sliding latch 312, situated on-one of the upper or lower shells 202 or 204, may be slid between open and locked positions to additionally secure upper and lower shells 202 and 204 forming the enclosure within package 200. Latch 312 has a generally C-shaped cross-section to engage a "guide" lip 310 on either shell 202 or 204 and an opening (not shown) along one edge so that latch 312, when upper and lower shell 202 and 204 are fitted together, receives the "catch" lip 310 on the opposite shell 202 or 204 when in the open position and engages the "catch" lip 310 on the opposite shell 202 or 204 when in the locked position.

Lower shell 204, on at least two opposite sides of package 200, also includes recessed handles 314 beneath the rim at which upper and lower shells 202 and 204 are fitted together and behind lip 312 on lower shell 204. Recessed handle 314 may be formed by an indented portion of the sidewall of lower shell 204 leading to a small (e.g., 0.75 inch by 3 inch) area oriented substantially perpendicularly to the sidewalls of lower shell 204.

FIG. 3B depicts a cut-away view of the assembled package 200, including drain pan jug 206 as well as upper and lower shells 202 and 204. Drain pan jug 206 is of liquid-impermeable with the exception of opening 316 in the upper surface 320. Opening 316 includes sidewalls 318 extending into the interior of drain pan jug 206. The perimeter of the upper surface 320 of drain pan jug 206 is surrounding by a lip 322, and the upper surface 320 is sloped in all directions from the perimeter to opening 316. Drain pan jug 206 does not significantly protrude above the height of lower shell 204 when nested therein. The combined height of lower shell 204 and drain pan jug 206 when drain pan jug 206 is nested within lower shell 204 is preferably small enough to permit insertion under a typical vehicle (e.g., less than about 6–8 inches high). Drain pan jug 206 may therefore be employed to capture used motor oil as it is drained from a vehicle, with the sloped upper surface 320 directing captured motor oil to opening 316 and thence to the interior of drain pan jug 206. Lower shell 204 includes interior support ribs 324 for supporting drain pan jug 206.

An integral plug 326 protruding from an interior upper surface on upper shell 202 fits into and seals opening 316 on drain pan jug 206 when upper and lower shells 202 and 204 are fitted together with drain pan jug 206 contained therein. One or more O-rings 328 around plug 326 or the inner perimeter of opening 316 may provide the necessary sealing capability. Plug 326, and opening 316 within the upper surface 320 of drain pan jug 206, are preferably offset from the center of the respective surface (the interior upper surface of upper shell 202 or upper surface 320 of drain pan jug 206) to provide an obvious indication of the orientation in which upper shell 202, lower shell 204, and. drain pan jug 206 are proper fitted together.

FIG. 3C depicts a cross-sectional view of the toungue-and-groove latching mechanism providing retention of upper shell 202 to lower shell 204. An outer surface of the rim of lower shell 204 slopes to a curved end of the rim. The rim of upper shell 202 is forked, with a catch on the interior of the outer fork situated to form a neck through which the ball-shaped end of the lower shell rim cannot pass. However, a device inserted between the upper and lower shell rims may force the fork branches on the upper shell rim apart sufficiently to allow the ball-shaped end of the lower shell rim to pass. This tongue-and-groove type mechanism provide both mechanical retention of the upper and lower shells 202 and 204 and sealing of the enclosure therein. Additional reinforcement of the mechanical retention is provided by the sliding latches described above. In an alternative embodiment, O-ring seals may be utilized in lieu of the tongue-and-groove construction.

Figure 4:
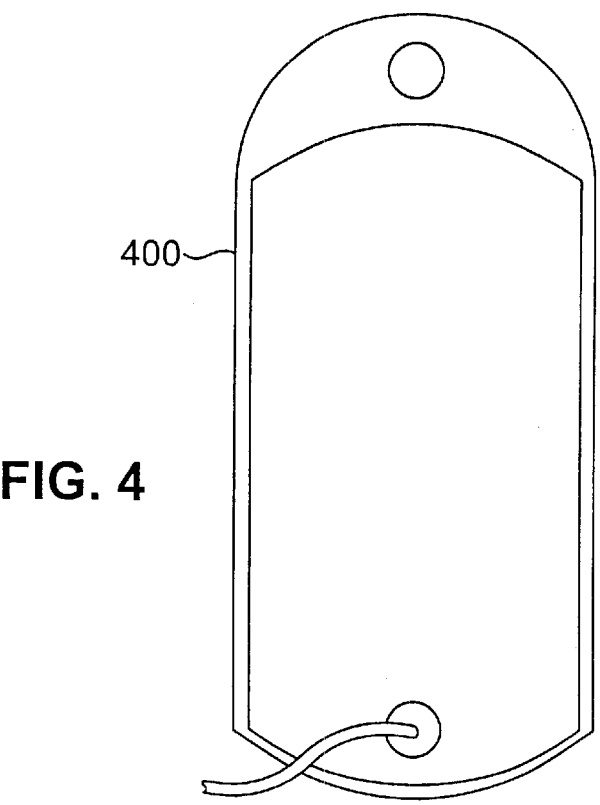
FIG. 4 is an illustration of a container for distribution of new or unused product in accordance with a preferred embodiment of. the present invention.

Referring to FIG. 4, a container for distribution of new or unused product in accordance with a preferred embodiment of the present invention is illustrated. Bag 400 is employed to distribute new or unused product. Bag 400 is of a material similar to intravenous ("IV") solution bags employed by medical professionals.

Referring now to FIGS. 1–2, 3A–3C and 4 together, package 200 may be employed to distribute new or unused motor oil and to recover used or spent motor oil with distribution and recovery system 100. New or unused motor oil is placed in bag 400 and packaged together with package 200 for distribution to the consumer. The consumer 118 utilizes drain pan jug 206 to capture the used or spent motor oil, then places drain pan jug 206 with the captured motor oil in lower shell 204. New or unused motor oil is then transferred to the vehicle from bag 400, which is placed on top of drain pan jug 206 together with the used oil filter. Upper shell 202 is then fitted to lower shell 204 to plug the opening in drain pan jug 206 and to encapsulate drain pan jug 200, bag 400 from which the new or unused motor oil was dispensed, the used oil filter, and any other oil contaminated materials, such as paper towels, for proper management. Upper shell 202 is prelabeled with the delivery address of an appropriate reclamation center and includes prepaid postage or other indicia of payment for the delivery services. Package 200 and its contents are then left by the consumer 118 in a suitable location for pickup by the commercial package service.

The commercial package service conveys package 200 and its contents to reclamation facility 122. At reclamation facility 122, upper and lower shell 202 and 204 are separated and the contents removed. The used oil filter and the empty bag 400 are properly handled. Drain pan jug 206 and its contents are placed in a commercial shredder, which shreds drain pan jug 206 and separates the used motor oil from the pieces of drain pan jud 206. The used motor oil is transmitted to product recycling facility 106 for recycling. The shredded remains of drain pan jug 206 is transmitted for use as fuel, providing up to three times the energy of an equivalent mass of coal.

Upper and lower shell 202 and 204 are, if in suitable condition, returned to packaging facility 108 for reuse. If worn or otherwise unusable, however, upper and lower shell 202 and 204 are first recycled by existing methods for use as feedstock for injection molding processes, including manufacture of new upper and lower shells.

The present invention permits reusable product to be efficiently recovered by transmission of replacement product with a package suitable for capture of used product and transmission to an appropriate reclamation facility via common commerical package delivery services. This eliminates a principle obstacle to recovery of spent product which has resulted in improper handling: the effort required to transport the used product to an appropriate recycling or disposal facility. The principle of the invention may be extended to hazardous waste, such as medical waste.

The description of the preferred embodiment of the present invention has been presented for purposes of illustration and. description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for processing used motor oil packaged for efficient recycling or reclamation, comprising:

receiving a container at a processing facility from a package delivery service, wherein the container includes a hard shell enclosing a sealable, disposable drain pan jug adapted for capturing used motor oil draining from a vehicle and containing used motor oil;

separating the shell, the drain pan jug, and any other materials within the container;

retrieving used motor oil within the drain pan jug for transmission to a recycling facility;

destroying the drain pan jug;

processing the shell for reuse; and disposing of the other materials within the container.

2. A method for processing used motor oil packaged for efficient recycling or reclamation, comprising:

receiving a container at a processing facility from a package delivery service, wherein the container includes a hard shell enclosing a sealable, disposable drain pan jug adapted for capturing used motor oil draining from a vehicle and containing used motor oil;

after receiving the container and contents within the container, separating a reusable portion of the container from a recyclable or reclaimable portion of the contents within the container;

recycling the recyclable or reclaimable portion of the contents within the container;

disposing of a remaining portion of the contents within the container; and processing the reusable portion of the container for reuse.

* * * * *